(No Model.)
C. E. SCRIBNER.
POLICE ELECTRIC SIGNAL SYSTEM.
No. 384,476. Patented June 12, 1888.
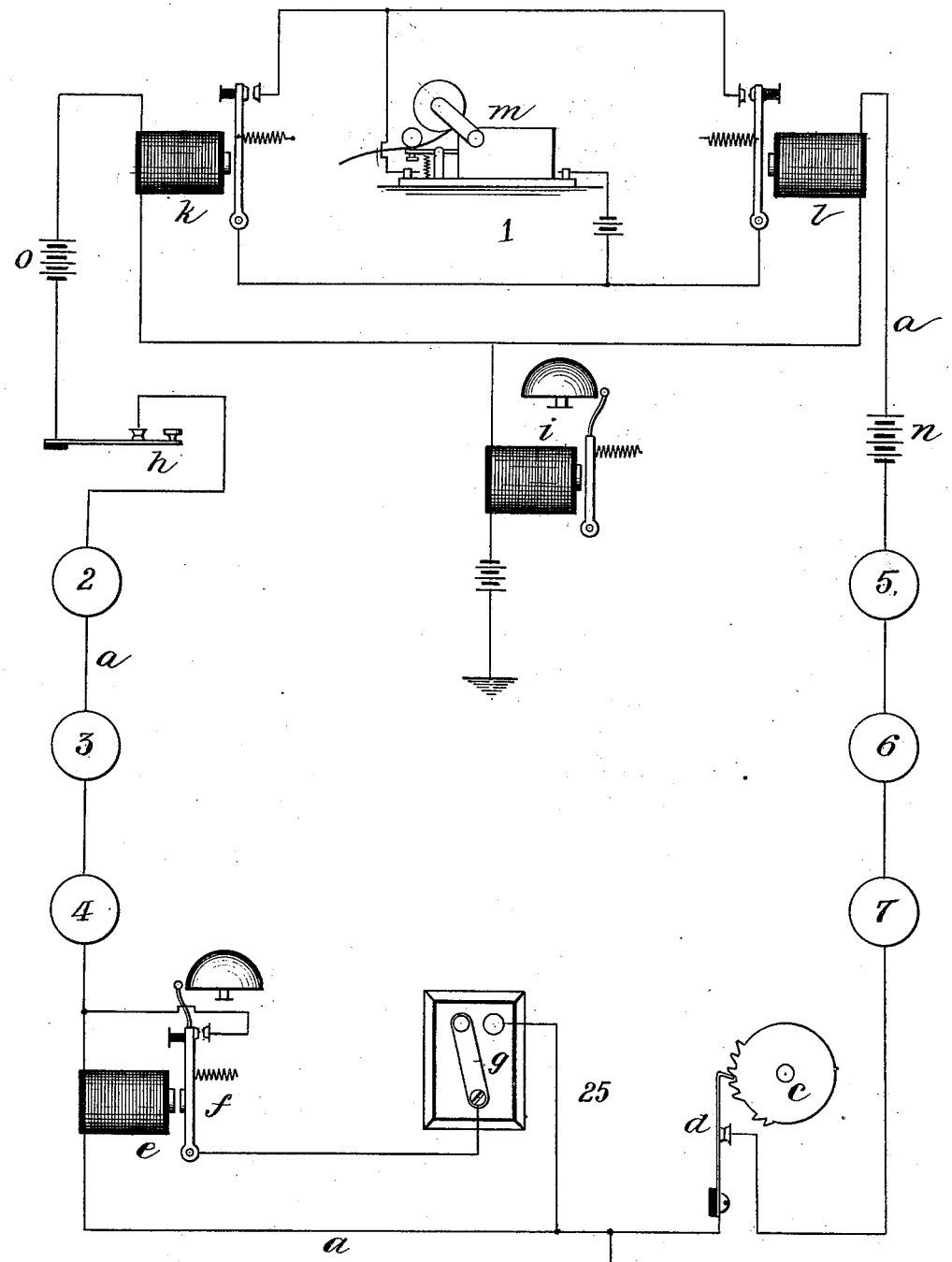
Witnesses:
Saml. B. Dover.
Wm. M. Giller.
Inventor.
Charles E. Scribner,
By George P. Barton,
Attorney.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

POLICE ELECTRIC SIGNAL SYSTEM.

SPECIFICATION forming part of Letters Patent No. 384,476, dated June 12, 1888.

Application filed December 27, 1886. Serial No. 222,707. (No model.)

*To all whom it may concern:*

Be it known that I, CHARLES E. SCRIBNER, a citizen of the United States, residing at Chicago, in the county of Cook and State of Illinois, have invented a certain new and useful Improvement in Police Electric Signal Systems, (Case 129,) of which the following is a full, clear, concise, and exact description, reference being had to the accompanying drawing, forming a part of this specification.

My invention relates to electric signal apparatus, and is especially designed for use as a part of a police-service. Circuits extending from the main or patrol station are provided with district boxes so connected and arranged that a signal may be sent in from any box and registered at the patrol-station. Such systems have heretofore been generally used in cities with the very best results. In some cases telephones have been used in connection with or in place of the district boxes, so that conversation can be maintained between any point on the circuit and the central station.

My invention herein consists in providing at each station in connection with the district box a branch circuit, which may be closed to ground, and a switch in connection with the answer-back signal of the district box, and at the central station two relays, one in each branch or side of the metallic circuit to operate the register included in a local circuit connected with the relays. I also place a battery in each side or limb of the metallic circuit at the central station; and between said batteries provide a branch circuit through a bell and another battery to ground, which branch is normally closed. On closing the ground-connection at any station circuit will be closed through the bell at the patrol-station. Thus the central station may be called from any sub-station or box upon the circuit. The coils of the electro-magnets of the answer-back-signal devices at the different stations are normally shunted out of circuit through the armatures of said electro-magnets and the switches which I have provided in the said shunt-circuits around the electro-magnets.

By the use of my invention the district boxes may be used to send in specific signals in the ordinary manner over the metallic circuit. Simultaneously telegraphic communication may be carried on between any other stations and the central station over the same metallic circuit.

In the accompanying diagram, which is illustrative of my invention, I have shown the register, relays, batteries, and bell at the central station connected with the circuit, including several sub-stations, a portion of the apparatus at one station being illustrated in detail.

The circuit $a$ extends from the central station 1 through sub-stations 2, 3, 4, 5, 6, 7, and 25. At station 25 I have shown the key $b$, by means of which the metallic circuit may be closed to ground. The break-wheel $c$ and the key or spring $d$ operated thereby are also indicated at station 25. I have not considered it necessary to show the clock-train and other portions of the box in detail, as such boxes are too well known to require detailed description.

The electro-magnet $e$ of the answer-back-signal device is normally shunted out of circuit through the armature $f$ of said electro-magnet and switch $g$, all devices which form no part of my invention herein. The shunt around said electro-magnet $e$ is broken after each call has been turned in. The armature $f$ is thus drawn to the poles of electro-magnet $e$ until the circuit is broken by opening the key $h$ at the central office, whereupon a single stroke is given to the bell by the movement of the armature $f$ away from said poles, and thereupon the shunt is again closed around electro-magnet $e$.

In case it is desired to send in any signal telegraphically by key $b$, said key is closed to ground, thus ringing bell $i$ at the central station. Any code of signals may be arranged so that the bell $i$ may indicate different services, according to the manner in which it is rung by key $b$. When key $b$ is in service, the switch $g$ should be open, as shown, in order that the central office, by means of the key $h$, may answer back upon the bell at station 25. When key $h$ is operated, it is evident that the circuit $a$ will be broken. The operator, however, being at the central station and within sight and hearing of the register, would at once stop breaking the key $h$ in case the register began to move.

We will suppose that the box at station 25 is turned in when all the other boxes of the circuit are out of service. It is evident that as the circuit *a* is broken by box 25 the relays *k l* will both be operated simultaneously, and that the signal will be recorded upon the Morse register or other receiving device included in the local circuit. Suppose, however, that when box 25 is turned in the metallic circuit is closed to ground at any other of the stations 2, 3, 4, 5, 6, 7—for example, station 3. In this case relay *l* would be included in the circuit formed from station 3 through stations 4, 25, 7, 6, 5, battery *n*, and bell *i*, and the relay *l* will thus be operated to close a local circuit through the receiving-instrument *m*. Or suppose the ground-circuit were closed at station 6. In this case the box 25 and the relay *k* would be included in a ground-circuit, which may be traced from station 6 to stations 7, 25, 4, 3, 2, battery *o*, relay *k*, and bell *i* to ground. Relay *k* will thus respond to the breaks made by the box 25, and the armature of relay *k*, as it comes against its back contact-point, will cause the signal from box 25 to be registered upon the signal-receiving device *m*.

As to the state of the art prior to my invention, reference is made to Letters Patent No. 172,219, granted January 11, 1876.

By the use of my invention one circuit is made sufficient for doing all the work. I prefer to use the register *m* connected in a local circuit, as shown at the central station; but it is evident that the signals might be read directly from the relays *k l*.

Having thus described my invention, I claim as new and desire to secure by Letters Patent—

1. The combination, with a metallic circuit, of a receiving-instrument in a local circuit and two relays, one on each side thereof, a branch circuit to ground, including battery and signal-receiving device, batteries in the metallic circuit, one on each side of said ground-branch, and a circuit-breaking device, all at the central station, and district signal-boxes included in said metallic circuit at different sub-stations, and a normally-open ground-branch at each of said stations, including a key for closing the metallic circuit to ground, and a signal-receiving device at each station, substantially as described.

2. The combination, with a metallic circuit, including a central station and several sub-stations, of a branch circuit at the central station from said metallic circuit to ground, said branch including a battery and electro magnet of a signal-receiving device and battery included in said metallic circuit on each side of said ground-branch at the central station, signal-transmitting instruments included in said metallic circuit at different stations, and a key at each of one or more of the stations, whereby the metallic circuit may be closed to ground at said key or keys, as desired, substantially as described.

In witness whereof I hereunto subscribe my name this 16th day of November, A. D. 1886.

CHARLES E. SCRIBNER.

Witnesses:
GEORGE P. BARTON,
WM. M. GILLER.